Jan. 9, 1945.  S. C. VARBLOW  2,367,076
CLUTCH LINKAGE
Filed June 15, 1942  2 Sheets-Sheet 1

Inventor
Stanford C. Varblow
By Blackmore, Spencer & Flint
Attorneys

Jan. 9, 1945. S. C. VARBLOW 2,367,076
CLUTCH LINKAGE
Filed June 15, 1942 2 Sheets-Sheet 2
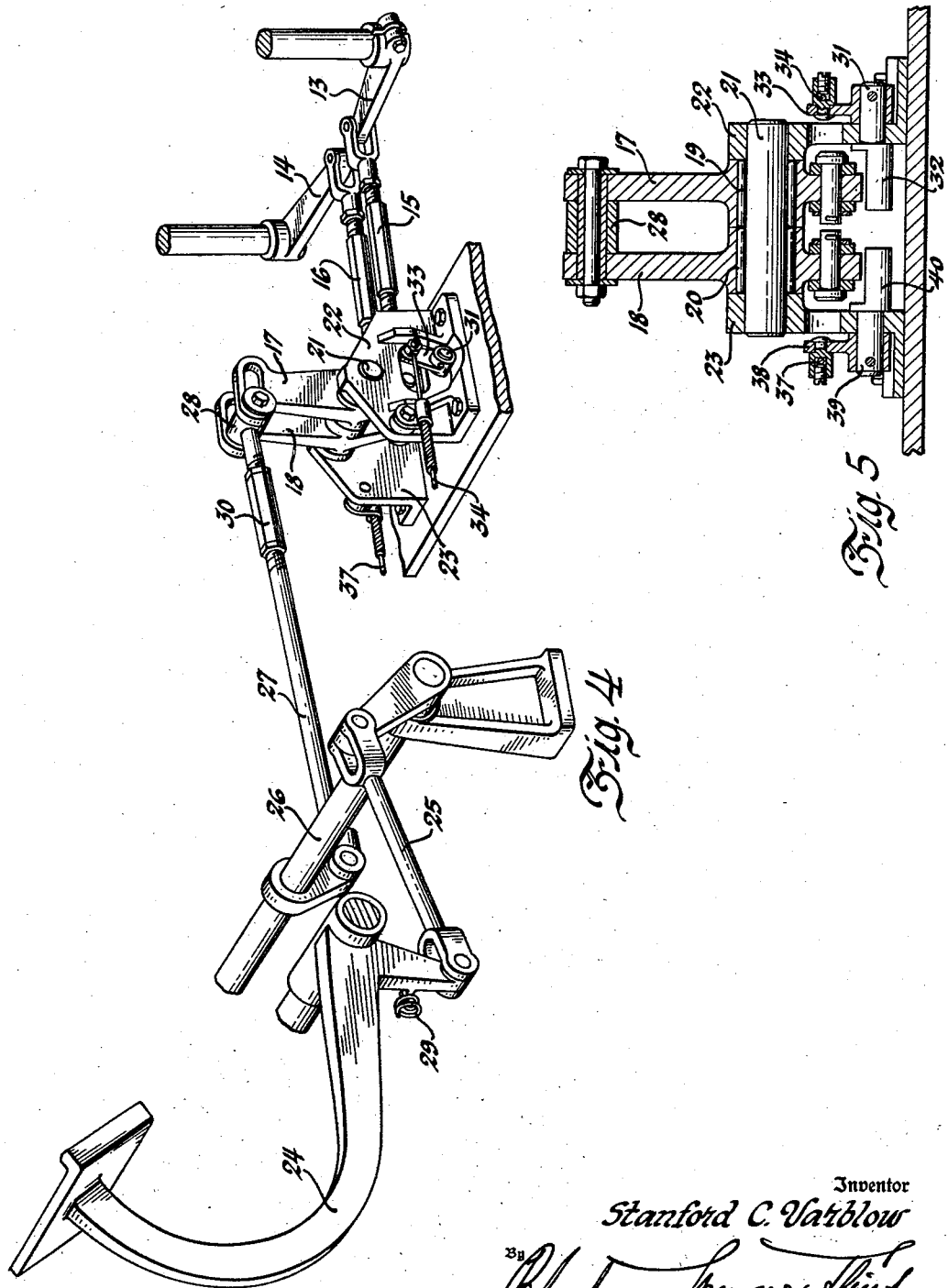
Inventor
Stanford C. Varblow
By Blackmore, Spencer & Flint
Attorneys Patented Jan. 9, 1945

2,367,076

UNITED STATES PATENT OFFICE 2,367,076

CLUTCH LINKAGE

Stanford C. Varblow, Detroit, Mich., assignor to General Motors Corporation, Detroit, Mich., a corporation of Delaware Application June 15, 1942, Serial No. 447,085

2 Claims. (Cl. 74—478)

This invention relates to controls for a multiple engine drive. In a specific embodiment to be hereinafter referred to the invention has been applied to the clutch throwout mechanism for a pair of engines which furnish the drive in a military tank or other vehicle.

An object of the invention is to provide an improved control for a number of devices to be operated at will either conjointly or individually according to preselection and from a single controller device in the station at which the vehicle operator is located.

A further object is to provide a simple and low cost arrangement to enable the vehicle operator seated at his station easily and quickly to throw out both clutches and then lock out either thereof for the further continued control of the other clutch in the event single engine drive is desired. Ordinarily, dual engine drive with both clutches under control of the same clutch pedal is available for high speed travel and for hard pulling in soft ground while single engine drive is sufficient to move the vehicle at lower speed and on hard surfaced roads. For single engine drive that engine which is out of commission should be declutched from the power transmitting train and the operation of its clutch divorced from the clutch pedal operation. This is especially the case in a driving arrangement for tanks wherein the clutch driven shafts are coupled together to drive through a variable speed transmission and the conventional steering differential between endless tracks on opposite sides of the vehicle. The control of the lockout from the driver's station is of particular importance if one of the engines gets out of order during the time a military vehicle is engaged in combat because under critical conditions the operator can immediately declutch and lockout that engine and proceed under the power of the other engine.

Figure 1:
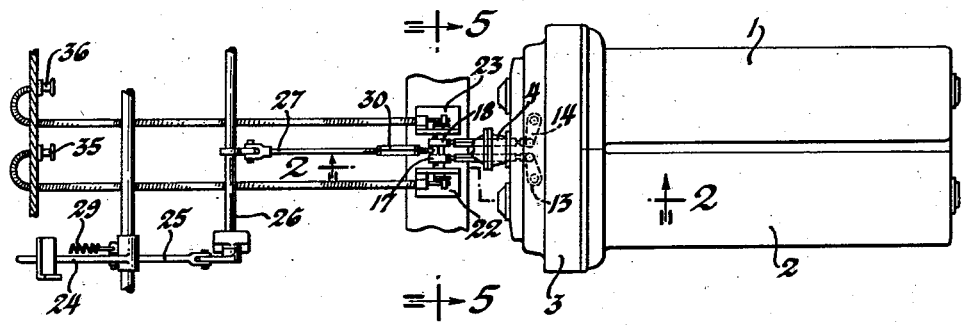
Figure 2:
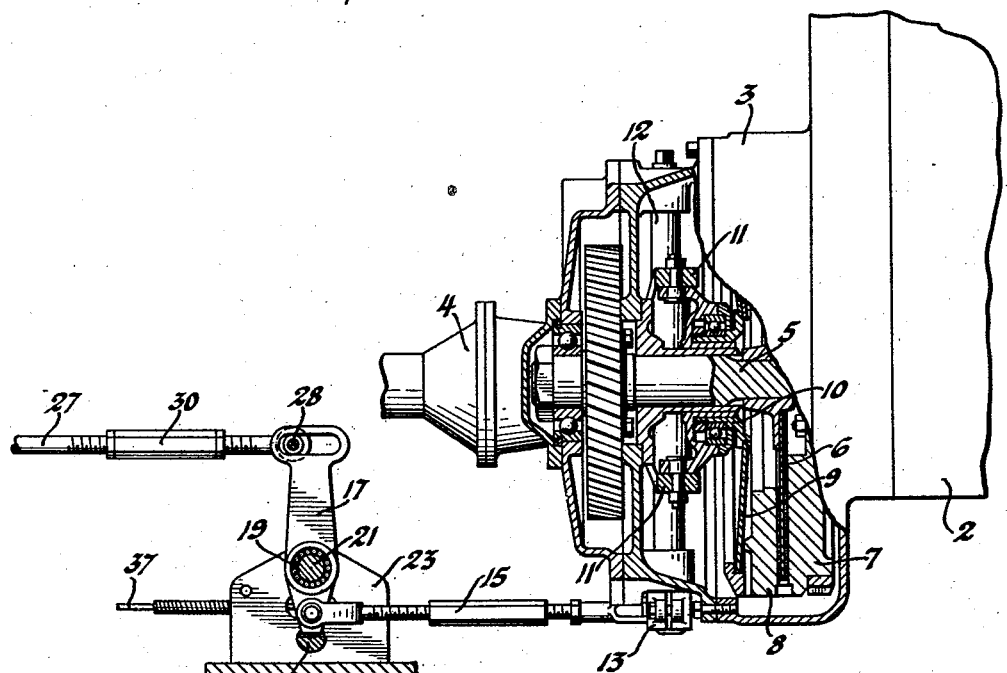
Figure 3:
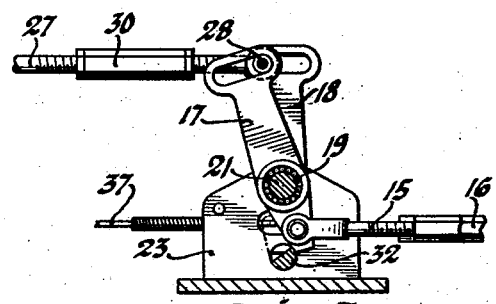

For a better explanation of the invention reference will be made to the accompanying drawings wherein Figure 1 is a top plan view of a portion of a dual drive installation together with the clutch control mechanism; Figure 2 is an enlarged fragmentary view, partly in section, as on line 2—2 of Figure 1; Figure 3 shows the clutch throwout levers of Figure 2 with one of the levers in clutch engaging position and the other lever in clutching disengaging position; Figure 4 is a perspective view of the clutch control linkage and Figure 5 is a transverse sectional view taken on line 5—5 of Figure 1.

In the drawings the reference numerals 1 and 2 indicate the pair of internal combustion engines arranged side-by-side and coupled to a transfer case and clutch housing 3. Within the transfer case is a centrally disposed gear arranged to be driven from a pair of gears, one on each of the clutch driven shafts. The centrally disposed gear in turn is coupled by a universal joint indicated at 4 to a propeller shaft leading to any suitable type of variable speed transmission to drive the usual steering differential mechanism.

Any suitable type of clutch may be employed to couple the transfer gears with the respective engines. By way of example Figure 2 shows a clutch driven shaft 5 carrying the driven plate 6 located between the engine flywheel 7 and a pressure plate 8. A Belleville type spring 9 normally exerts its spring force to maintain the clutch parts in drive relation. Its coupling action can be overcome by the sliding movement of a collar 10 surrounding the driven shaft 5 and engaged with the central portion of the Belleville spring disk 9. The clutch throwout collar 10 is jointed at diametrically opposite points to a pair of lever arms 11 which are rigid with a vertically disposed clutch throwout shaft 12. The clutch throwout shaft 12 for the left-hand engine 2 extends downwardly through the wall of the casing 3 and at its lower end carries a rock arm 13. A similar rock arm 14 is secured on the corresponding throwout shaft for the clutch of the right-hand engine 1.

The two operating arms 13 and 14 extend inwardly toward one another and are coupled by turnbuckle links 15 and 16 with a pair of clutch throwout levers 17 and 18 arranged side-by-side. The rock levers 17 and 18 are mounted on a common axis by having their enlarged apertured hubs fitted with needle bearings 19 and 20 surrounding a fulcrum pin 21 which is fixed at opposite ends in a pair of support brackets 22 and 23. The turnbuckle links 15 and 16 are joined to the lower arms of the throwout levers 17 and 18 and by their individual adjustment take up slack and enable the throwout levers to be set in the same relative angular position when both clutches are fully engaged.

Disengagement of both clutches is effected by depression of the clutch pedal 24 pivoted in the operator control station and linked by a push rod 25 to a crank arm on a rockshaft 26, which latter is linked by a pull rod 27 with both of the levers 17 and 18. The connection between the pull rod 27 and the two throwout levers is in the nature of a one-way or lost motion connection and is afforded by forming the upper ends of both levers with elongated slots in which are fitted the opposite ends of a T-bolt 28. In the clutch engaging position of all the parts the T-bolt is located in the forward end of the elongated slots in the levers 17 and 18 and the parts are so located by the resilient force of the pedal return spring indicated at 29. For setting the parts initially and to enable subsequent necessary adjustments the stem of the T-pin 28 is threaded into one end of a coupling nut 30 whose other end is oppositely threaded on the terminal portion of the pull rod 27. In the normal operation of both clutches, depression of the foot pedal 24 pulls the T-pin 28 forward and carries with it both of the throwout levers 17 and 18 to declutching position. Release of foot pressure on the pedal 24 allows the parts to be restored by reason of the resilient force of the spring 29 and the return pressure of disk springs in both clutches.

For locking out one or the other clutches in declutched position, abutments are provided for projection into the return paths of the levers 17 and 18. In one case, the mounting bracket 22 has pivotally supported therein a rockshaft 31 having an enlargement 32 at its inner end in the nature of a half cylinder which normally extends below the lower end of the lever 17. At its outer end the rockshaft 31 has fixed thereon the lever 33 which is fastened to the end of a stiff flexible wire 34 which latter extends through a flexible casing into the driver's control station and terminates in a knob or hand button 35 as best seen in Figure 1. A similar hand button 36 is fastened on one end of another wire 37 extending through a casing and terminating at its opposite end in a connection with a lever 38 mounted on a rockshaft 39 which is pivoted in the mounting bracket 23. This rockshaft 39 also ends in a half cylinder enlargement 40 normally positioned immediately below the throwout lever 18. The end portions 40 and 32, respectively, constitute crank arms on the respective rockshafts and the position of the rockshafts in relation to the lower ends of the throwout levers is such that when the levers are pulled forward upon depression of the foot pedal 24 either of the crank arms 32 and 40 may be projected upon rotation of its rockshaft through the Bowden wire connections with the control buttons 35 and 36 in the control station.

Projection of one or the other of the crank arms into the return path of the throwout levers affords an abutment stop to retain the selected clutch throwout lever in forward declutched position. Thereafter release of the clutch pedal will allow an unlocked throwout lever to return to clutch engaged position but will have no effect on the lever which is locked out and the one-way motion transmitting connection afforded by the pin and slot will accommodate relative angular displacements of the rock levers, as illustrated in the detail view, Figure 3. As long as the selected hand button is pulled out, clutch pedal operation controls the coupling operation of one, but not the other, of the clutches.

The use of separate crankshafts 31 and 39 each operated by independent Bowden wire assemblies has some advantages over the optional use of a single rockshaft having cranks mounted thereon in angular spaced relation, with only one control button movable to different settings to bring the respective abutment cranks selectively into lockout position.

While only a preferred embodiment has been illustrated, it will be obvious that the invention is capable of modification and application to installations of more than two clutches or other similar devices arranged for selective unison and independent operation from a single pedal or other like controller.

I claim:

1. Control mechanism for a pair of clutches arranged in parallel for either conjoint or separate drive relation, comprising a T-headed reciprocable rod, a pair of clutch control levers having slotted arms, in the slots of both of which said T-headed rod has lost motion connection, means normally urging said levers from clutch disengaged position to clutch engaged position and taking up the lost motion of said connection, and means operative to hold said levers selectively in clutch disengaged position in which the lost motion of said connection is effective.

2. Control mechanism for a pair of clutches arranged in parallel for connecting or disconnecting either or both of a pair of power sources with a single drive shaft, including a pair of clutch control levers movable between clutch connecting and disconnecting positions, separately operable lever movement blocking devices selectively projectible into the path of said levers in travel from clutch disconnecting positions and a single manually operable reciprocable rod terminating in a T-headed end operatively engaging both of said clutch control levers, said clutch control levers having retaining and bearing slots therein to receive said T-headed end and to accommodate relative rod movement when a lever is blocked in clutch disconnecting position.

STANFORD C. VARBLOW.